United States Patent [19]

Jung

[11] Patent Number: 5,577,011
[45] Date of Patent: Nov. 19, 1996

[54] METHOD FOR PREVENTING ERRONEOUS RECORDING IN COMPACT DISC PLAYER

[75] Inventor: Jung J. Jung, Seoul, Rep. of Korea

[73] Assignee: SamSung Electronics Co., Ltd., Suwon, Rep. of Korea

[21] Appl. No.: 327,550

[22] Filed: Oct. 24, 1994

Related U.S. Application Data

[62] Division of Ser. No. 832,916, Feb. 10, 1992, Pat. No. 5,359,583.

[30] Foreign Application Priority Data

Feb. 13, 1991 [KR] Rep. of Korea .................. 91-2395

[51] Int. Cl.$^6$ ................................................. G11B 7/00
[52] U.S. Cl. ............................ 369/47; 369/54; 369/58
[58] Field of Search .......................... 369/32, 47, 48, 369/49, 50, 53, 54, 58, 83, 84, 124; 360/15, 31

[56] References Cited

U.S. PATENT DOCUMENTS

| | | | |
|---|---|---|---|
| 4,791,622 | 12/1988 | Clay et al. | 369/48 X |
| 4,817,075 | 3/1989 | Kikuchi et al. | 360/15 X |
| 4,839,879 | 6/1989 | Sawada et al. | 369/54 |
| 5,021,893 | 6/1991 | Scheffler | 360/15 |
| 5,132,956 | 7/1992 | Ichikawa | 360/31 X |
| 5,359,583 | 10/1994 | Jung | 369/54 |

Primary Examiner—Georgia Y. Epps
Assistant Examiner—P. W. Huber
Attorney, Agent, or Firm—Robert E. Bushnell, Esq.

[57] ABSTRACT

A method for preventing erroneous recording in compact disc player is disclosed, to prevent erroneous recording and selecting erroneous data during reproduction, wherein the conventional compact disc player is improved in such a manner that a memory is provided so as to store the data temporarily and to delay the recording of the data as required, and errors are detected during the delayed period of time, thereby preventing such a defective music from being recorded.

15 Claims, 3 Drawing Sheets

METHOD FOR PREVENTING ERRONEOUS RECORDING IN COMPACT DISC PLAYER

This is a divisional of application Ser. No. 07/832,916, filed Feb. 10, 1992, now U.S. Pat. No. 5,359,583.

FIELD OF THE INVENTION

The present invention relates to a method for preventing an erroneous recording in a compact disc player in which the compact disc player can record audio data while preventing erroneous recording and selecting a defective music during a reproduction.

BACKGROUND OF THE INVENTION

Recently, the use of a recording and/or reproducing apparatus has become popular.

In popular recording and/or reproducing apparatus using semiconductor lasers and other lasers, there is usually adapted an optical disc apparatus.

The above apparatus automatically records and/or reproduces audio data by forming pits on the face of disc.

In such a conventional recording and/or reproducing apparatus, the recording is made by using a write once disc which can record only once. Therefore, during a data recording, if noises are input from the external, or if a recording mistake happens, the disc has to be discarded as a useless thing, because the erroneously recorded data can not be erased.

SUMMARY OF THE INVENTION

The present invention is intended to overcome the above described disadvantages of the conventional techniques.

Therefore, it is an object of the present invention to provide a method for preventing erroneous recording to prevent erroneous recording and to prevent selecting a defective music during a reproduction in a compact disc player capable of recording additionally.

In order to attain the object, the method for preventing erroneous recording in a compact disc player according to the present invention is characterized it, that data to be recorded is temporarily stored in a memory having a predetermined capacity so as to delay the recording of the data as long as required for storing the data in the memory, the recording onto a disc is halted upon finding an error during the delaying period for the storing, and the erroneous recording is removed from the TOC music list as soon as the recording is completed.

In order to achieve the above object, the erroneous recording preventing method according to the present invention includes the steps of designating an address in a memory upon producing digital audio signals in order to store the signals in the memory and setting a defective music number to the stored data upon finding a defect flag set music in the case of a partly recorded disc, judging the presence of a user's erroneous recording input signal, recording the information about the music data into the program memory area and setting: a defect flag in the presence of the erroneous recording input signal after elapsing a predetermined period of time, recording the audio data onto the compact disc in the case of absence or the erroneous recording signal and the full memory and judging the presence of the user's recording termination demanding input signal judging whether it is an intermediate stop in the absence of the recording termination demanding signal so as to return the operation to the second step upon finding none of the intermediate stop and to record the information on the music data into a program memory area upon finding an intermediate stop, and recording into a lead-out area upon producing the recording termination demanding signal and recording into a lead-in area except the case that a defect flag is set.

BRIEF DESCRIPTION OF THE DRAWINGS

The above object and other advantages of the present invention will become more apparent by describing in detail the preferred embodiment of the present invention with reference to the attached drawings, in which.

DESCRIPTION OF THE PREFERRED EMBODIMENT

Figure 1:
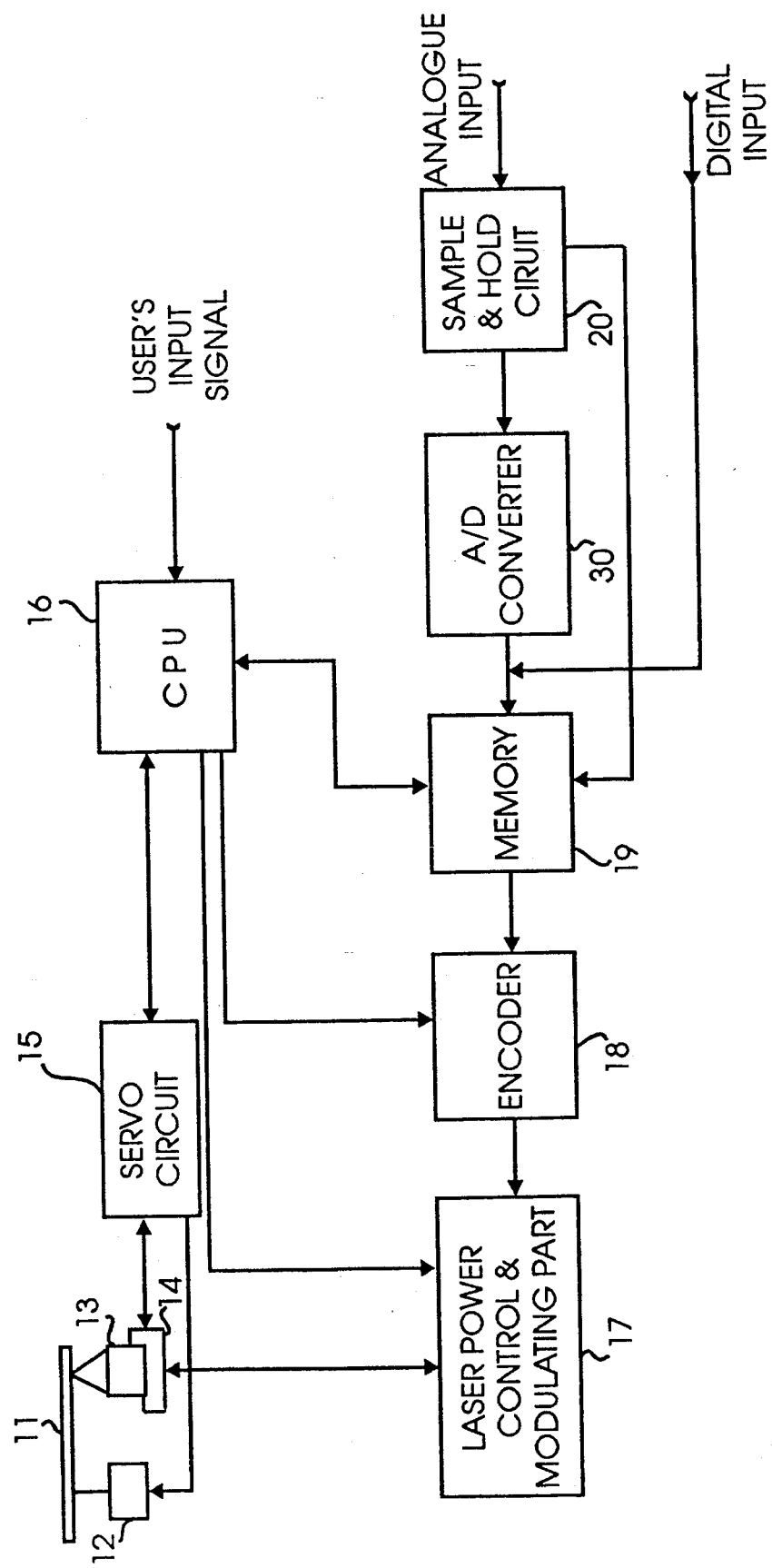
FIG. 1 is a block diagram showing a hardware used in the present invention.

FIG. 1 is a block diagram showing a hardware used in the present invention. As shown in FIG. 1, the hardware includes a compact disc 11 for recording data, a spindle motor 12 for rotating the compact disc 11 under a proper control, an optical pickup part 13 for writing to and reading from the compact disc 11 after receipt of laser modulated signals under a proper control, a sled motor 14 for horizontally moving the optical pickup part 13 under a proper control, a servo circuit 15 for feeding back focusing servo signals and tracking servo signals to the sled motor 14 after detecting them according to the pickup information of the optical pickup part 13 and for controlling the spindle motor 12 at a constant linear velocity (to be called CLV hereinafter) or below it, a central processing unit CPU 16 connected to the servo circuit 15 to control the overall system by carrying out processing based on the internal program; a sample and hold circuit 20 for carrying out sampling and holding an analogue input sisal, an analogue-to-digital converter (hereinafter, to be termed A/D converter) 30 for converting analogue signals to digital signals, a memory 19 for storing digital signals in the form of eight fourteen modulation (to be called "EFM") signals for a predetermined period of time under the control of the CPU 16 after receipt of the output from the A/D converter 30, an encoder 18 for encoding parity forming signals and EFM modulation signals according to the servo code signals of the CPU 16 after receipt of the output from the memory 19, and a laser power control and modulating part 17 for maintaining the laser power at a certain level after receipt of the output from the encoder 18 and for carrying out optical modulations on the EFM modulation signals before providing them.

Figure 2A:
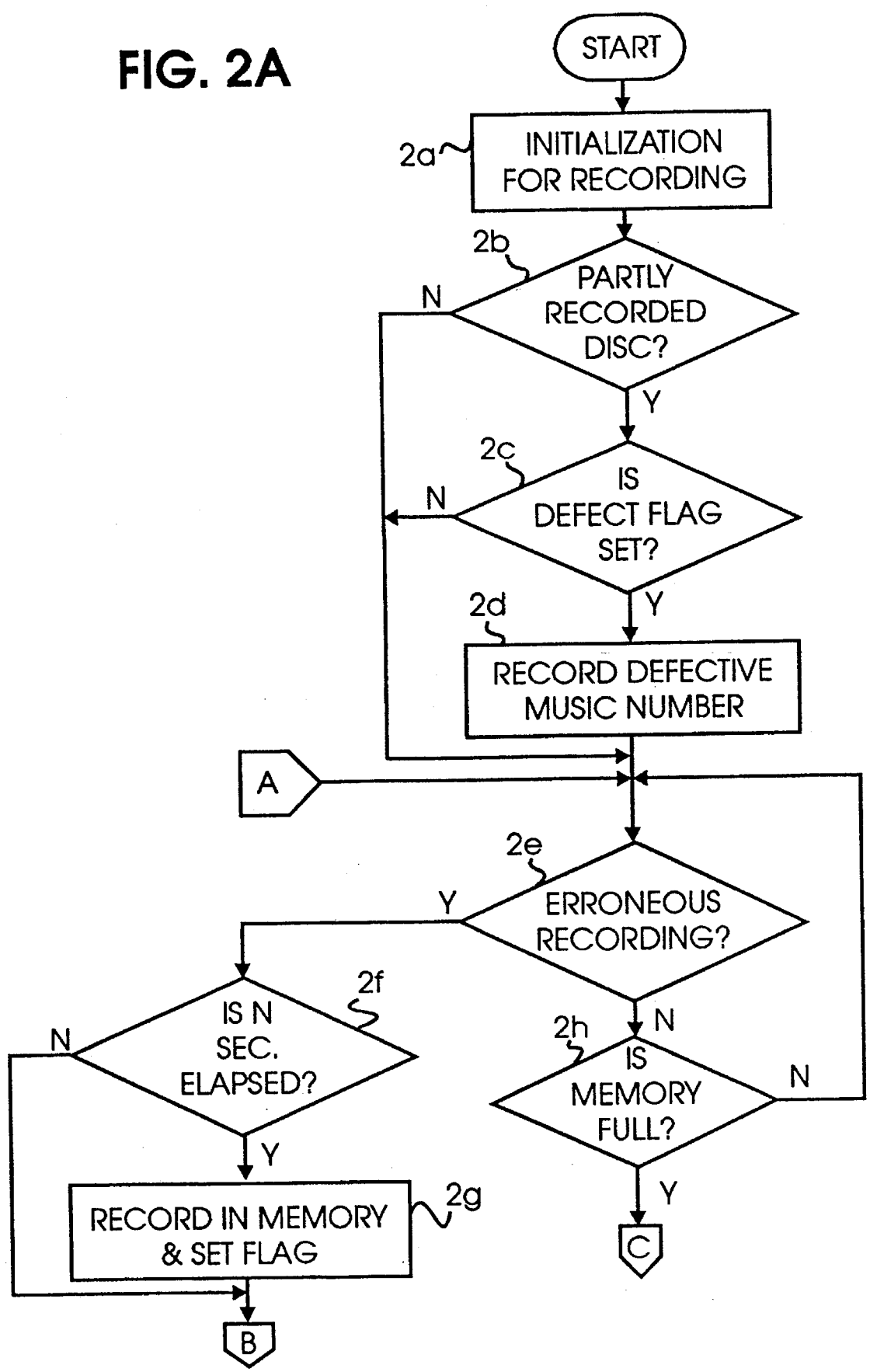
FIGS. 2A and 2B are flow charts showing control operation of the present invention.
Figure 2B:
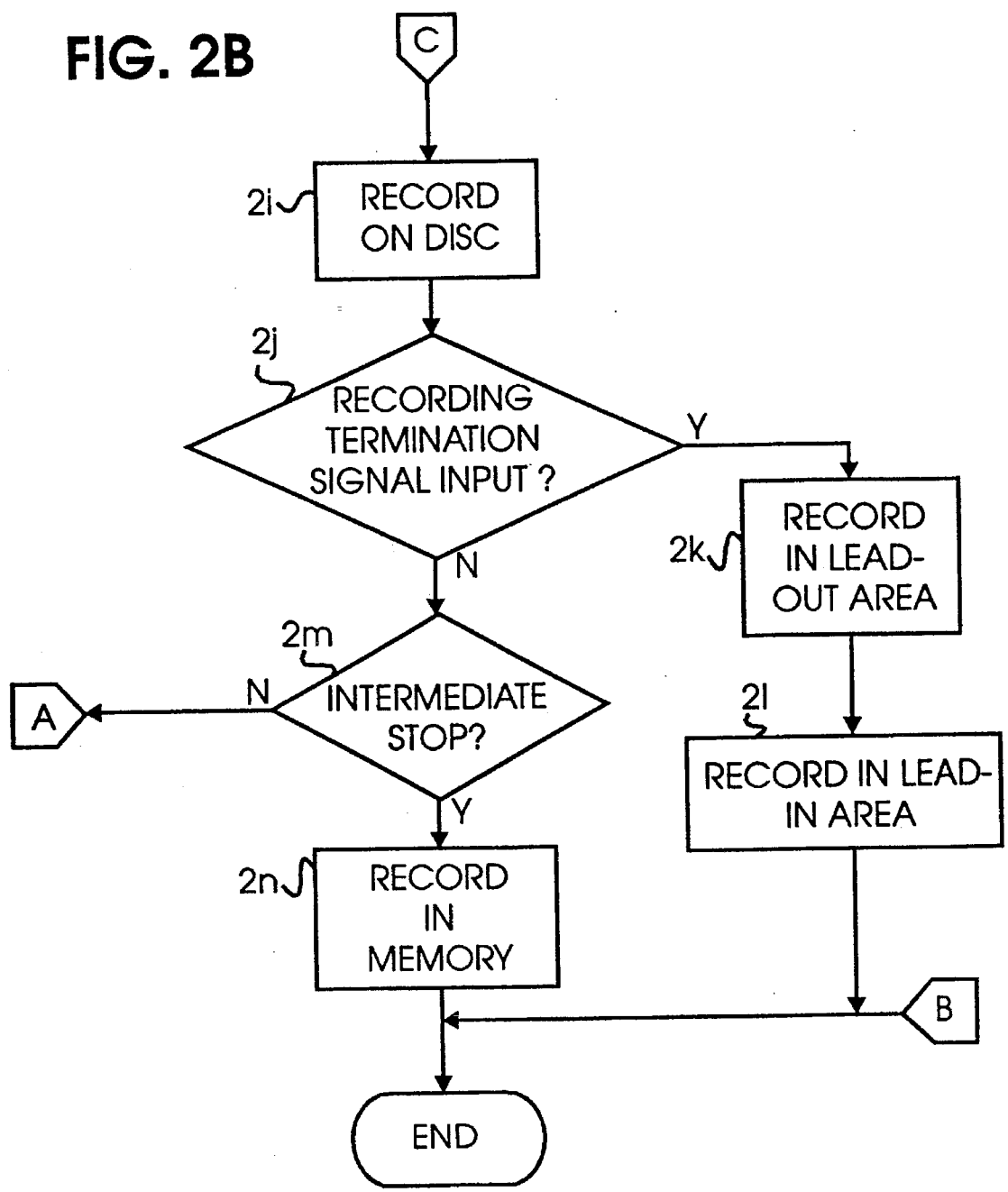

FIGS. 2 and 2B are flow charts showing control operation of the present/invention, herein the method of the present invention comprises the step of designating an address in the memory upon producing digital audio signals in order to store the digital signals into the memory and setting a defective music number to the stored data upon finding a defect flag set music in the case of a partly recorded disc, judging whether a user's erroneous recording input signal is input, recording the information on the music into the program memory area and setting a defect flag upon finding the erroneous recording input signal after elapsing a predetermined period of time a recording the audio data onto the compact disc upon finding norm of erroneous recording and upon finding the memory filled to the full, and then, judging whether the user's recording termination demanding signal is input, judging whether there is an intermediate stop upon finding none of recording termination demanding signal in order to return the operation to the second step upon finding none of intermediate stop and to record the music into the program memory area upon finding an intermediate stop, and recording into a lead-out area after receipt of a recording termination demanding signal and recording into a lead-in area except the case that a defect flag is set.

The present invention as above will now be described in further detail.

The compact disc capable of recording additionally is being widely used by the general public, and, in this situation the present invention improves the impeding factors in such a manner that an erroneously recorded music is skipped so as not to be recorded on the compact disc ultimately. The disc used in the present invention is compatible with the conventional write once disc, and classified into record completed disc, partly recorded disc, and blank disc.

Further, the disc is preformatted for the sake of recording convenience, and the disc includes information for CLV, information on recording power, and information on time.

Further, the disc is physically divided into power control area, program memory area, lead-in area, and lead-out area.

The power control area has different power level for different disc manufacturers, and, even in the case of a recommended recording power, different situations can be brought out depending on different recording systems. Thus, the control area shows only the information about power recommended by the manufacturer, and therefore, recording has to be performed after adjusting the laser power to the optimum level through repeated recording tests into the area. The program memory area has the function as described below.

The lead-out area and the lead-in area are commonly recorded after the termination of the recording on the disc so as for the disc to have a compatibility with the conventional discs. In the case here the disc is recorded additionally, the lead-out area and the lead-in area are not recorded, and information for the tracks on which recordings are made so far is recorded into the program memory area. That is, the program memory area is for recording an information on the recorded music, this recording being carried out each time an additional recording is made.

The constitution of the information recorded in the program memory area the same as that of a sub Q code which is allocated on a sub coding frame format together with a sub P code.

The lead-in area has the same size as that of the conventional compact disc, and this area is for recording the information on the recorded tracks of the disc, i.e., TOC (Table Of Contents).

The lead-out area has the same size as that of the conventional compact disc, and is to record the information to inform of the end of the disc.

Thus, in the present invention, the data to be recorded is stored temporarily in a memory having a predetermined capacity, so that the actual disc recording time should be delayed correspondingly to the capacity of the memory. Thus, if there is found an error during the delay time, the recording is stopped, and thus, the disc can not actually have an erroneous recording.

Further, even after elapsing the delay time, if the recording is slopped, a defect flag is set when recording it into the program memory area, and the relevant recording is removed from the music list of the TOC upon completion of the recordings, so that it can not be selected during reproduction.

The signals provided into the CPU 16 of FIG. 1 are generated by the user and include signals such as recording starting signal, recording termination signal, and erroneous recording input signal. These signals are generated by the user by pressing keys in a key panel.

The A/D converter 30 and sample and hold circuit 20 is activated only when the analogue audio signals are provided from the external.

If the externally input signals are digital signals, they are directly stored in the memory 19, where the analogue inputs and the digital inputs are called music in the present invention.

If a recording start signal is input, the CPU 16 outputs an address signal, so that the externally input digital signals or the output from the A/D converter 30 is stored in the memory 19.

The memory 19 has a predetermined capacity, and, if a delay of N (N represents a positive real number) seconds is realized, N is set to be such that N cells =176.4 kilo bytes ×8 according to the usual formula for calculating the memory capacity of compact disc player. The value of 176.4 kilo bytes represents the data sampling frequency (per second) of compact disc player, and 8 is used as the multiplier in order to convert bytes into bits.

When the capacity of the memory is filled to the full, the CPU 16 controls the encoder 18 to generate sub code control signals, and the CPU 16 further controls the laser power control and modulating part 17 as well as the servo circuit 15.

The functions of the laser power control and modulating part 17, the encoder 18 and the servo circuit 15 are the same as those which are described above in connection with their constitutions, and therefore, the descriptions on their functions will be skipped, these being the general aspects of the components.

If there occurs an error due to a noise-contained music and the like during the memory storing period, the user can input an erroneous recording input signal into the CPU 16 by pressing the key.

No the operations of the circuit of the present invention will be described referring to the flow chart of FIG. 2.

First, the user installs a compact disc 11 to record into the spindle motor 12, and then, inputs a recording start signal. Then the CPU 16 carries out an initialization for a recording at a substep 2a of FIG. 2, and the CPU 16 judges at a substep 2b to whether the currently installed disc is a partly recorded disc or not in order to recognize the state of the disc. If it is a partly recorded disc, it is checked at a substep 2c whether a defect flag is set in the program memory area.

If it is found that a defect flag is set on the music at the substep 2c, a music number is set in order to record a defective music number at a substep 2d. If it is found at the substep 2b that the disc is not a partly recorded disc, then it is judged that the disc is blank. If it is found that no defect flag is set on at the substep 2c , it is decided that the music is normal.

The substeps 2a, 2b , 2c and 2d are included in a first is recording preparing step. Further, in this first step, the recorded music is converted to digital audio data and stored in the memory 19.

At a substep 2e in a second step, the CPU judges whether an erroneous recording input signal is provided by the user.

At the second step, the user has to input an erroneous recording input signal with in the time after finding an error.

In the case here an erroneous recording input signal is provided at the substep 2*e*hen the predetermined period of time set at a substep 2*f* correspondingly to the memory capacity has elapsed, the information on the music to be recorded into the program memory area is recorded at a substep 2*g* and a defect flag is set up before terminating the recording. The substeps 2*f* and 2*g* are included in a third step.

If no erroneous recording input signal is provided at the substep 2*e*, a judgment is made at a substep 2*h* whether the memory is filled to the full. If the memory is not filled to the full, the operation is returned to the substep 2*e*, while if it is filled to the full, the contents of the memory is recorded onto the disc 11 at a substep 2*i*. The amount of the recording performed at the substep 2*i* is equivalent to the capacity of the memory 19, and then a judgment is made at a substep 2*j* whether the user'is recording termination demanding signal is provided. The substeps 2*h*, 2*i*, and 2*j* are included in a fourth step.

If no recording termination demanding signal is provided at the substep 2*j*, a judgment is made at a substep 2 whether it is an intermediate stop. If it is an intermediate stop, a writing is performed into the program memory area at a substep 2*n* before terminating the recording. The substeps 2*j*, 2*m* and 2*n* are included in a fifth step.

If a recording termination demanding signal is provided at the substep 2*j*, a recording is made into the lead-out area at a substep 2*k*, and a recording is made into the lead-in area at a substep 2*l*. When performing a recording into the lead-in area at the substep 2*l*, the case here a defect flag is set up are excluded.

This is for excluding undesired music from selection during reproduction. The substeps 2*k* and 2*l* are included in a sixth step.

According to the compact disc player of the present invention, there is provided a memory capable of temporarily storing the data to be recorded, and the recording is delayed as much as required for storing into the memory, thereby detecting errors during the delay time. As a result, it becomes possible to prevent recording a undesired music or defective music, so that they should not be selected during reproduction later.

The invention is in no way limited to the embodiment described hereinabove, various modifications of the disclosed embodiment as well as other embodiments of the invention will become apparent to persons skilled in the art upon reference to the description of the invention. It is, therefore, contemplated that the appended claims will cover any such modifications or embodiments as fall with in the true scope of the invention.

What is claimed is:

1. A circuit for preventing an erroneous recording of music data representing music onto an optical recording medium, comprising:

spindle motor means for rotating the optical recording medium;

optical pickup means for recording and reproducing the music data to and from the optical recording medium, respectively;

sled motor means for horizontally moving the optical pickup means across the optical recording medium;

servo means for controlling said sled motor means by feeding back a focusing servo signal and a tracking servo signal, received from the optical recording medium by the optical pickup means, to said sled motor means;

memory means for temporarily storing said music data received from an external source different from the optical recording medium, to generate a stored signal;

encoding means for encoding a parity forming signal and said stored signal to generate an encoded signal;

laser power control and modulating means for maintaining optical pickup means power at a given level, and for modulating said encoded signal to generate said music data; and control means for controlling said servo means, encoding means, laser power control and modulating means, and for enabling transmission of said stored signal from said memory means only after said memory means is full and a user does not input an error signal, said error signal providing an indication that errors are present in said stored signal.

2. The circuit as claimed in claim 1, further comprising:

conversion means for converting an analog signal from the external source to said music data.

3. The circuit as set forth in claim 1, further comprising:

said control means designating an address in said memory means upon providing an audio signal in order to store said audio signal into said memory means as stored music data, and setting a defective music number to said stored music data upon finding a defect flag set in a case of a partly recorded disc;

said control means determining whether a user enters an erroneous recording input signal indicative of an error detected by said user during said designating step;

said control means enabling said optical pickup means to record information concerning said audio signal into a program memory area of the compact disc, and to set said defect flag upon finding said erroneous recording input signal after a predetermined period of time has elapsed;

said control means reading said music data from said memory and enabling recording of said music data into said program memory area of the compact disc by said optical pickup means upon not finding said erroneous recording input signal and upon finding said memory full, said control means determining whether the user enters a recording termination demanding signal indicating a termination of said recording of said music data;

said control means determining whether an intermediate stop occurs upon not finding said recording termination demanding signal, and returning the operation to determining whether a user enters an erroneous recording input signal in the absence of said intermediate stop, and enabling said optical pickup means to record said information concerning said audio signal into said program memory area in the presence of said intermediate stop; and said control means enabling said optical pickup means to record end of disc information into a lead-out area of the compact disc when the user enters said recording termination demanding signal, and to record table of contents information into a lead-in area of the compact disc when the user enters said recording termination demanding signal and said defect flag has not been set.

4. A method of preventing erroneous recording of music data representing music onto an optical recording medium, comprising the steps of:

making a first determination of whether a defect flag is set in a program memory of the optical recording medium, said defect flag indicating an error in recorded data on the optical recording medium;

storing the music data in a main memory to produce stored data;

making a second determination of whether a user has entered an erroneous recording signal;

recording the stored data in said program memory area of the optical recording medium when said user has not entered said erroneous recording signal and the main memory is full;

recording information concerning said stored signal in the program memory and setting said defect flag when a predetermined time has elapsed from storing said music data in the memory to a determination that said erroneous recording signal has been entered;

making a third determination of whether the user has entered a recording termination signal;

recording table of contents information in a lead-in area of the optical recording medium when the user has entered said recording termination signal and said defect flag has not been set, and recording end of disc information in a lead-out area of the optical recording medium when the user has entered said recording termination signal; and recording information concerning said stored signal in the program memory area when the user has not entered said recording termination signal and an intermediate stop occurs.

5. The method as claimed in claim 4, wherein said step of making a first determination comprises:

checking whether the optical recording medium is a partly recorded disc;

checking if said defect flag is set if the optical recording medium is a partly recorded disc; and recording a defective music number if said defect flag is set.

6. The method as claimed in claim 4, further comprising:

repeating said step of making a second determination if the user has not entered said recording termination signal and said intermediate stop does not occur after said stored data is recorded in the program memory area of the optical recording medium.

7. A circuit for preventing an erroneous recording of first data representing music onto an optical recording medium, comprising:

spindle motor means for rotating the optical recording medium;

optical pickup means for recording and reproducing the first data to and from the optical recording medium, respectively;

sled motor means for horizontally moving the optical pickup means across the optical recording medium;

servo means for controlling said spindle motor means by feeding a focusing servo signal and a tracking servo signal to said sled motor means, said focusing servo signal and said tracking servo signal being detected by said optical pickup means from the optical recording medium;

memory means for temporarily storing said first data representing music received from an external source different from the optical recording medium, to delay recording of said first data for a period of time substantially equal to a time required to store said first data in said memory means;

encoding means for encoding a parity forming signal and said first data to generate an encoded signal;

laser power control and modulating means for maintaining optical pickup means power at a given level, and for modulating said encoded signal to generate said first data; and control means for controlling said servo means, encoding means, laser power control and modulating means, and for enabling transmission of said first data from said memory only after said memory means is full and a user does not input an error signal, said error signal providing an indication that errors are present in said first data;

said control means halting said recording of said first data onto the optical recording medium upon making a determination that said errors are present in said first data, and removing an erroneous recording from a table of contents music list on the optical recording medium upon completion of said recording.

8. The circuit as claimed in claim 7, further comprising:

conversion means for converting an analog music signal from the external source to said first data.

9. The circuit as set forth in claim 7, further comprising:

said control means making a determination of whether a defect flag is set in a program memory of the optical recording medium, said defect flag indicating an error in recorded data on the optical recording medium;

said control means storing the first data in said memory means to produce stored data;

said control means making a determination of whether a user inputs an erroneous recording signal;

said control means controlling said optical pickup means for recording the stored data in said program memory area of the optical recording medium when said user has not input said erroneous recording signal and said memory means is full;

said control means controlling recording of information concerning said stored signal in the program memory and setting said defect flag when a predetermined time has elapsed from storing said first data in said memory means to a determination that said erroneous recording signal has been input;

said control means making a determination of whether the user has input a recording termination signal;

said control means controlling recording of table of contents information in a lead-in area of the optical recording medium by said pickup means when the user has input said recording termination signal and said defect flag has not been set, and controlling recording of end of disc information in a lead-out area of the optical recording medium when the user has input said recording termination signal; and said control means controlling recording of information concerning said stored signal in the program memory area when the user has not input said recording termination signal and an intermediate stop occurs.

10. A method for preventing erroneous recording in a compact disc player provided with a memory, comprising the steps of:

designating an address in a memory upon providing an audio signal in order to store said audio signal into said memory as stored music data, and setting a defective music number to said stored music data upon finding a defect flag set in a case of a partly recorded disc;

determining whether a user inputs an erroneous recording input signal indicative of an error detected by said user during said designating step;

recording information concerning said audio signal into a program memory area of the compact disc, and setting said defect flag upon finding said erroneous recording input signal after a predetermined period of time has elapsed;

reading said music data from said memory and recording said music data into said program memory area of the compact disc upon not finding said erroneous recording input signal and upon finding said memory full, and determining whether the user inputs a recording termination demanding signal indicating a termination of said recording said music data;

determining whether an intermediate stop occurs upon not finding said recording termination demanding signal, to return the operation to said step of determining whether a user inputs an erroneous recording input signal in the absence of said intermediate stop, and to record said information concerning said audio signal into said program memory area in the presence of said intermediate stop; and recording end of disc information into a lead-out area of the compact disc when the user inputs said recording termination demanding signal, and recording table of contents information into a lead-in area of the compact disc if the user inputs said recording termination demanding signal and said defect flag is not set.

11. The method as set forth in claim 10, said step of designating an address further comprises the steps of:

determining whether said compact disk has been partially recorded on;

performing said step of determining whether a user inputs an erroneous recording input signal after determining said compact disk had not been partially recorded on;

checking in said program memory area for said defect flag when said compact disk has been determined to have been partially recorded on;

performing said step of determining whether a user inputs an erroneous recording input signal after no defect flag had been found in said program memory area.

12. The method as set forth in claim 10, said step of determining whether a user inputs an erroneous recording input signal further comprises the steps of:

determining whether said period of time has elapsed when it has been determined that a user has input said erroneous recording input signal; and halting the storage of the music data into said memory and preventing the recording of the music data onto the compact disc upon determining said erroneous recording input signal has been input and said period of time has not elapsed.

13. The method as set forth in claim 10, further comprising the step of:

removing information regarding an erroneous recording from a Table of Contents music list in said lead-in area upon completion of said step of recording said music data onto said compact disc in response to said defect flag which was set upon finding said erroneous recording input signal and after said predetermined period of time had elapsed during said step of recording information concerning said audio signal into said program memory area of the compact disc.

14. The method as set forth in claim 10, said step of designating an address further comprises the steps of:

receiving, at a central processing unit, a recording start signal in response to user activation of one of a plurality of keys on a panel of said compact disk player; and providing address signals from said central processing unit to said memory for determining memory locations for storing said music data in response to said recording start signal.

15. The method as set forth in claim 14, said step of designating an address further comprises the steps of:

temporarily storing the music data in said memory, said memory having a predetermined capacity, to delay recording of the music data onto said compact disk for a period of time substantially the same as a time required to store the music data in said memory in response to user input of said recording start signal.

* * * * *

UNITED STATES PATENT AND TRADEMARK OFFICE
CERTIFICATE OF CORRECTION

PATENT NO. : 5,577,011
DATED : November 19, 1996
INVENTOR(S) : Jung Joo Jung

It is certified that error appears in the above-indentified patent and that said Letters Patent is hereby corrected as shown below:

Title page, item [75], Inventor should be--Jung Joo Jung--.

Signed and Sealed this

Twenty-ninth Day of July, 1997

Attest:

BRUCE LEHMAN

Attesting Officer

Commissioner of Patents and Trademarks